July 20, 1965
C. W. SKARSTROM
3,195,292
FRACTIONATION OF GASEOUS MIXTURES BY ABSORPTION
Original Filed May 16, 1960
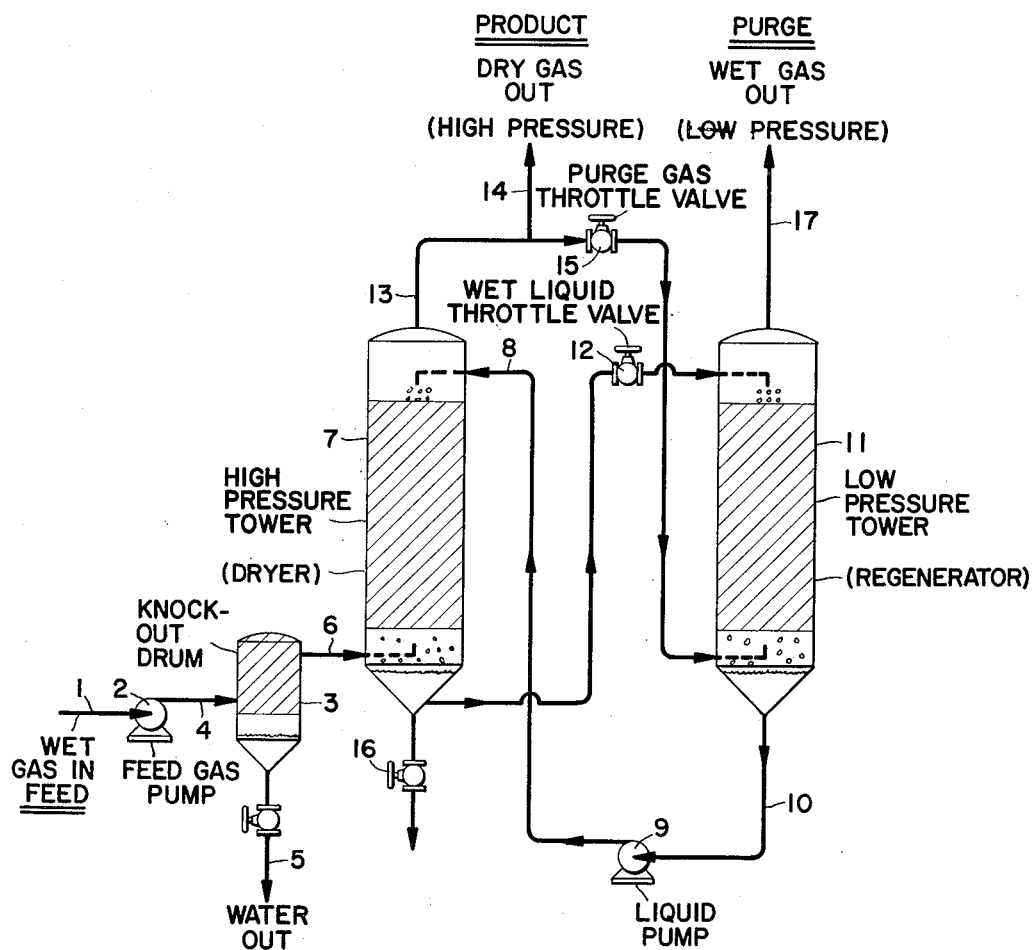
Charles W. Skarstrom Inventor
By W. V. Feilman
Patent Attorney

United States Patent Office 3,195,292
Patented July 20, 1965

3,195,292
FRACTIONATION OF GASEOUS MIXTURES
BY ABSORPTION
Charles W. Skarstrom, Montvale, N.J., assignor to Esso
Research and Engineering Company, a corporation of
Delaware
Continuation of application Ser. No. 29,343, May 16,
1960. This application Mar. 26, 1964, Ser. No. 357,346
6 Claims. (Cl. 55—32)

This application is a continuation of Serial No. 29,343, filed May 16, 1960, now abandoned.

The present invention relates to a method for fractionating gaseous mixtures. The invention relates more particularly to a method for removing one or more key components from a gaseous mixture or gas stream containing such components. The invention is further concerned with a method as employed for the separation from a gaseous mixture of one or more component contaminants. The invention also relates to a method employed for the purpose of producing an effluent product wherein by removal of one or more components of the original mixture, the percentage concentration of more desirable components is increased in the resulting product. A specific adaptation of the invention is concerned with the drying of a gaseous mixture, such as air, by the removal of water vapor therefrom. The invention, however, may be used for the segregation of any key component, such as the removal of nitrogen or oxygen from a stream of atmospheric air to increase the concentration of either in the effluent product stream.

In accordance with a specific adaptation of the invention, the gaseous mixture to be fractionated or a component removed therefrom, is introduced in the lower area of a high pressure tower. A liquid absorbent is introduced into the upper area of the high pressure tower and countercurrently contacts the upflowing feed stream. The absorbent containing the absorbed component is withdrawn from the lower area of the high pressure tower and introduced into the top of a low pressure tower. A primary effluent product containing a reduced amount of the key component is withdrawn from the top of the high pressure tower and removed as a product stream. A portion of the primary effluent is passed through a pressure reducing valve and introduced into the bottom of a low pressure tower. The upflowing gas in the low pressure tower countercurrently contacts the downflowing absorbent under conditions to remove from the absorbent the key component absorbed in the high pressure tower. The gas containing the key component is withdrawn from the top of the low pressure tower and further handled or processed as desired. The absorbent free of the key component is withdrawn from the bottom of the low pressure tower and introduced into the top of the high pressure tower. The entire process is characterized by the lack of supplying or withdrawing external heat.

In various industrial processes, moisture-free or oxygen- or nitrogen-rich air streams are essential to proper operating procedures. Many methods and a variation of apparatus combinations are known or have been proposed to obtain such ends. Most involve either complicated procedures or equipment expensive to assemble and operate. It is an object of the present invention to provide a simple method and apparatus which, with minor modification, may be employed in a multitude of situations where the purification or concentration of gaseous mixtures is desired. The objects of the present invention are to provide a separation system such as an absorption system for the drying of air or other gaseous materials, without need for employment of extraneous heat to restore the absorbent used in the system; to provide such a system, wherein relatively small amounts of absorbent material are required for efficient operation, and therefore, wherein expenditures for equipment are considerably reduced; and to provide a method and apparatus whereby oxygen and/or nitrogen-rich products may be recovered from atmospheric air without liquefaction or other expensive or complicated procedures.

The terms "gas" and "gaseous" as employed in the following description or claims are intended to include not only materials that are conventionally considered to be gases, but also those materials conventionally considered to be vapors. Also, the term "key component" as employed in the following description or claims is used to designate the component or components selectively absorbed from a stream of a gaseous material initially fed to the system.

The present invention may be fully understood by reference to FIGURE 1, illustrating the same. The invention will be described in conjunction with an operation for the removal of water vapor from a wet gas. The feed gas is introduced into the system by means of feed line 1 and compressor 2, and is then passed by means of line 4 into knock-out drum 3. Condensed moisture is removed from the bottom of drum 3 by means of bottom drawoff line 5. The gas at a pressure in the range from about 30 p.s.i. to 300 p.s.i. and higher is withdrawn from the top of drum 3 by means of line 6 and introduced into the bottom of high pressure tower 7, which is maintained at a pressure in the range from 30 p.s.i. to 300 p.s.i. and higher.

Any suitable distributing means for the gas may be employed at the bottom of tower 7. A liquid absorbent is introduced into the top of the high pressure tower by means of line 8. Here again, any suitable distributing means may be utilized for the feed distribution of the liquid. The downflowing liquid countercurrently contacts the upflowing gas in tower 7 which may contain any type of packing or contacting means such as solid packing material or contacting trays. The liquid contacting the absorbed moisture is withdrawn from the bottom of tower 7 by means of line 20, passed through a pressure reducing valve 12 and introduced into the top of low pressure tower 11. Any suitable means for distributing the liquid may be employed in tower 11.

The treated gas free of moisture is withdrawn from the top of tower 7 by means of line 13 and a portion of this gas removed as a product stream by means of line 14. A portion of the gas is passed through pressure reducing valve 15 and introduced into the bottom of low pressure tower 11 by means of line 21. Any suitable distributing means for the gas may be utilized. The upflowing gas contacts the downflowing liquid in tower 11 under conditions whereby the moisture in the liquid is stripped therefrom and is removed from the top of tower 11 by means of line 17. Any suitable contacting means may be utilized in tower 11 such as packed masses, contacting trays and the like. The liquid, free of moisture, is removed from the bottom of tower 11 by means of line 10, passed through pump 9 and introduced into the top of high pressure tower 7 by means of line 8.

Thus, the operation consists of two towers, a high pressure and a low pressure tower. Each is designed for an upflowing gas to contact a downflowing liquid. A liquid desiccant is pumped from the bottom of the low pressure tower to the top of the high pressure tower. A liquid throttle valve allows the liquid to flow from the bottom of the high pressure tower back to the top of the low pressure tower.

The gas system consists of a wet feed gas pump 2, a liquid water knock-out drum 3 and a purge gas throttle valve. The wet feed gas flows upwardly through the high pressure tower. Some of the dry product gas is reduced in pressure through the purge gas throttle valve and flows upwardly through the low pressure tower. This purge gas regenerates (dries) the liquid. The wet low pressure purge gas from the top of the low pressure tower can be vented or returned to the wet gas feed pump suction. Liquid and gas motors can be substituted for the two throttle valves to recover power from the pressure reduction.

In the high pressure tower, water vapor in the wet high pressure gas is absorbed by the dry liquid desiccant. The dried gas comes out of the top of this tower. The wet liquid from the bottom is returned to the top of the low pressure tower. In the low pressure tower, some of the expanded dry gas product flows upward and strips water out of the downflowing liquid desiccant. The purge gas leaves the tower with the moisture originally in the gas feed. The partial pressure of the water vapor in the purge gas is the same or slightly less than the partial pressure of water vapor in the feed. The liquid desiccant transfers the water from the high pressure region to the low pressure region.

The gas flows have to be adjusted so that there are slightly more actual purge volumes than there are actual feed volumes per unit time. If D is the dry product flow in s.c.f.m. and R is the purge flow in s.c.f.m. then $$R \geq \frac{R+D}{P_{Hi}/P_{Lo}} \quad \text{Equation (1)}$$

where $P_{Hi}/P_{Lo}$ is the absolute pressure ratio between the two towers. This is the principle of the successful heatless drier using solid adsorbents.

The amount of liquid which must be circulated between the two towers depends upon the solubility of water in the liquid. For hydrophobic liquids, which exhibit a moisture saturation, it is helpful to define a ratio C of two different volumes which hold the same weight of water. The denominator of C is a certain volume of liquid desiccant which holds a given amount of dissolved water. The numerator is a volume of space which holds the same weight of water vapor in equilibrium with the liquid. (Note that if the liquid is 50% saturated, at equilibrium, the vapor space is also 50% saturated.)

$$C = \frac{\text{Space holding the same weight } H_2O \text{ vapor}}{\text{as is dissolved in a given volume of liquid}}$$

In the table below ratios are computed for hydrophobic liquids in which water is slightly soluble (in weight parts per million).

Table 1

| Water solubility in liquid, saturated at 20° C. | Ratio C |
|---|---|
| 50 wt. p.p.m. | 2 (approx.) |
| 100 | 4 |
| 200 | 8 |
| 400 | 16 |
| 800 | 32 |
| 1,600 | 64 |

Examples →

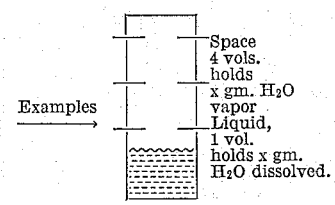

Space 4 vols. holds x gm. H₂O vapor
Liquid, 1 vol. holds x gm. H₂O dissolved.

The ratio C is relatively independent of temperature. In addition, C represents the compression ratio which water vapor undergoes when it dissolves in the liquid. Finally, the ratio C shows that C dry gas purges of a wet liquid will reduce the water content of the liquid by one half. Conversely, C water saturated gas purges of a dry liquid will one half saturate the liquid.

The minimum amount of liquid desiccant which must be circulated between the two towers can be read off from Table 1. For example, if the liquid desiccant holds 100 wt. p.p.m. water when saturated at 20° C., the water vapor compression ratio C is 4. This means that ¼ as many volumes of liquid must circulate as there are actual volumes of gas passing through the high pressure tower. To remove all the water vapor coming into the system, the liquid flow circulating between the two towers should be greater than $$\frac{(R+D)/C}{P_{Hi}/P_{Lo}} \text{c.f.m.} \quad \text{Equation (2)}$$

The liquid desiccants to be used in this process are ones in which water vapor dissolves more or less, and which exhibit a saturation effect. Such liquids are toluene, benzene, hexane, octanes, hydroformer feed, lube oils, jet fuels, gasoline and kerosene, various fuel oils, etc. If air is being dried, a liquid desiccant which does not oxidize easily is desirable, such as lube oil or a vacuum pump oil. Its low vapor pressure ($10^{-5}$ to $10^{-6}$ mm. Hg at room temperature) reduces the vapor carry-over into the dry gas product. The temperature of operation of the system is ambient, which is presumed to be the temperature of the wet gas feed. There is small advantage in other operating temperatures, unless C becomes significantly larger.

The following further illustrates the present invention:
The successful commercial operation of heatless dryers using solid absorbents and purge flows was computed by Equation 1.
Operations were made to determine C. Various hydrophobic liquids were saturated with water by passing water saturated nitrogen through them at atmospheric pressure and room temperature (75° F.). Dry nitrogen was then bubbled through them to remove the dissolved water. The moisture content of the effluent nitrogen was recorded together with the number of volumes of gas per volume of liquid (v./v.). The results are shown in Table 2.

Table 2

| Water saturated liquid (1 liter) | Dry nitrogen V gas/V liquid to dry liquid to 1/1,000 saturated |
|---|---|
| Isooctane | 23 |
| Toluene | 270 |
| Jet fuel (JP4) | 45 |

In drying out a water saturated hydrophobic liquid with a dry gas, the moisture content of the effluent gas is proportional to how much dissolved water is left in the liquid. When the effluent gas is 1/1000 saturated, then the liquid is 1/1000 saturated. This process follows an inverse exponential form:

$$w = w_o \exp(-K \, V \text{ gas}/V \text{ liq.}) \quad (3)$$

where $w$ is the moisture content of the liquid which is saturated with water when it holds $w_o$, the ratio $V$ gas/$V$ liq. is the number of purge volumes which have accrued, and K is a constant.

The compression ratio C which water vapor undergoes when it becomes dissolved in a liquid can be found from Equation 3, viz.

$$C = V \text{ gas}/V \text{ liq. when } w/w_o = \tfrac{1}{2} \quad (5)$$

For a dry liquid being saturated with wet gas, the equation takes the form $$w/w_o = 1 - \exp(-K\ V\ \text{gas}/V\ \text{liq.}) \quad (4)$$

This says that C is the number of volumetric dry (or wet) purges to reduce (or increase) the water content of the liquid by ½.

The data of Table 2 on this basis (Equations 3 and 5) enables C to be calculated. The values of the saturated water content (found from C and Table 1) compare well with approximate literature values. This is shown in the following table.

*Table 3*

|  | K | C=V gas/V liq. for w/wo=½ | Saturated H₂O content at 20° C., wt. p.p.m. | |
|---|---|---|---|---|
|  |  |  | Computed | Literature |
| Isooctane | 0.30 | 2.31 | 60 |  |
| Toluene | 0.0256 | 27 | 675 | 500 |
| Jet fuel JP4 | 0.173 | 4.5 | 112 | 100 |

These show that the concept of C, the compression ratio which water vapor undergoes, when it dissolves in typical hydrophobic liquids is a valid one. At the other extreme where water vapor condenses its own liquid, the compression ratio C is large and very sensitive to temperature. For water vapor to water liquid, $C=57,600$ at 20° C. and 1700 at 100° C. Finally, numerical values of C for various liquids can be used to compute the minimum circulation rate needed for drying gases with liquid desiccants in the novel process of this invention.

One important application for this process is the drying of recycle hydrogen in powerformers. The liquid desiccant can be the powerformer feed itself, which should have a $C=4.8$. The gas to be dried to low levels is the recycle hydrogen, which contains some light hydrocarbons (mostly methane). The wet purge gas can be recycled to the dryer feed or vented to the burner lines.

An advantage of this process is the partial removal of methane and heavier hydrocarbons from the dried hydrogen. Whenever a liquid has a different solubility for two different gases ($C\ \text{gas}_1 \neq C\ \text{gas}_2$), a partial separation is achieved with this process.

Another use for this process is as a composition amplifier. When used as a gas drying system, the water content of the purge gas (p.p.m.) is approximately $P_{Hi}/P_{Lo}$ times the water content in the feed. Moisture measurement in the purge gas can be done at high levels to follow low level moisture in the feed. The process is thus a composition amplifier for an analytical measuring instrument.

In essence, the present operation depends upon the fact that as the pressure is lowered, every other factor being constant, a greater amount of moisture will be taken from the liquid for a given amount of air. This is blown by the following table:

*Table 4*

Parts of moisture
removed
per million:                        Zone pressure p.s.i.a.

3.9 ------------------------------------------- 45
  5.0 ------------------------------------------- 35
  6.1 ------------------------------------------- 29
  7.0 ------------------------------------------- 25

From the above, when removing moisture from a hydrocarbon mixture, such as a powerformer feed, it is necessary to circulate approximately 4.8 volues of gas per volume of liquid at 10 pounds per square inch absolute pressure in order to remove all the moisture. The operation may be extended to include other systems such as the removal of oxygen from air to produce a nitrogen stream. The solvent comprises water and the high pressure zone is at 100 to 500 p.s.i.g., and the low pressure zone at atmospheric or below.

The system may be utilized to remove carbon dioxide, carbon monoxide and oxygen from the regeneration gas in a powerformer utilizing water. Likewise, the system can be used to produce an inert gas free of oxygenated compounds utilizing water.

Another operation wherein the present system can be used is to use a hydroformer feed to remove water and low molecular weight hydrocarbons from the recycle hydrogen gas. This operation is described in copending application Serial No. 21,702, filed April 12, 1960, now U.S. Patent No. 3,101,261 patented August 20, 1963.

Catalytic reforming has assumed increasing importance in petroleum refining as a result of the desire to upgrade the octane number of petroleum hydrocarbons. There are many catalytic reforming processes known in the art. Basically they may be divided into those employing a precious metal catalyst, as for example, platinum on alumina or other suitable base, or nonprecious metal catalysts, such as, molybdena, cobalt-molybdena, and the like. In general, any hydrocarbon boiling in the range of about 100° to 430° F. may be reformed at a reaction temperature range of about 800° to 1000° F. The reforming process is actually a combination of several types of chemical reactions, such as, aromatization, dehydrogenation of naphthenes, isomerization, and the like. The most desired reaction product is the $C_5+$ fraction which is readily employed as a high octane gasoline component.

More specifically, hydroforming is a process in which the normally liquid feed stock boils substantially within the range of from about 150° to 430° F. and more particularly 180° to 350° F. The light ends, i.e., the material boiling from 0° to 180° F., are not ordinarily subjected to this reaction, for the reason that the virgin naphtha light ends are not appreciably upgraded by conventional reforming treatments. The feed or charging stock to the hydroforming reactor can be a virgin naphtha, a cracked naphtha, a coker naphtha, a Fischer-Tropsch naphtha, a mixture of these, or the like.

Hydroforming operations are ordinarily carried out in the presence of hydrogen or hydrogen-rich recycle gas at temperatures of 750° to 1150° F. in a pressure range of about 50 to 1000 pounds p.s.i., and in contact with solid catalysts.

As mentioned, the chemical reactions involved in the hydroforming process include dehydrogenation of naphthenes to the corresponding aromatics, isomerization of straight chain paraffins to form branched chain paraffins, isomerization of cyclic compounds, such as ethylcyclopentane, to form methylcyclohexane, and some aromatization of paraffins, dealkylation and hydrocracking of paraffins. In a hydroforming operation which is conducted efficiently, it is possible with the use of a proper catalyst and proper conditions of operation to hydroform a virgin naphtha to a hydroformate, for example, having Research clear octane number of from 95 to 98 and obtain yields of $C_5+$ hydrocarbons as high as 80%.

Catalysts used in hydroforming are platinum, palladium, molybdenum oxide, chromium oxide, cobalt molybdate or, in general, oxides or sulfides of metals of Groups IV–VIII of the Periodic System of elements or mixtures of these elements supported or dispersed upon a base or spacing element, such as, alumina gel, precipitated alumina, or zinc aluminate spinel.

A particularly useful catalyst for hydroforming operations is .001 to 2.0 wt. percent platinum upon an alumina spacing agent or base.

In hydroforming operations hydrogen containing recycle and make gas is recycled with the feed in order to minimize coke deposition and to supply heat for the hydroforming reaction. When, as is conventionally done, platinum catalyst is extensively chlorine treated during the reactivation process, chlorine is subsequently stripped off the catalyst in the hydroforming process and is recycled with the recycle gas. Or where chlorides come in with the feed, they build up on the catalyst and are subsequently stripped off the catalyst and build up in the recycle gas.

The system also may be used utilizing as a solvent either ethylene glycol or glycerine to remove water from air or other gases.

What is claimed is:

1. Improved process for the removal of a key component from a gaseous mixture containing the same which comprises introducing said gaseous mixture as feed under pressure into the first end of a relatively high pressure zone having a first and second ends, introducing a liquid absorbent having a relatively slight ability to absorb said key component into the second end of said high pressure zone, countercurrently contacting said gas and said absorbent, removing said absorbent from the first end of said high pressure zone containing said key component and introducing the same directly into the first end of a low pressure zone having a first and a second end, removing a gaseous stream from the said second end of said high pressure zone as a primary product gas stream, segregating a portion of said product gas stream for purge and introducing the same into the said second end of said low pressure zone wherein the actual volume of purge gas to actual volume of feed ratio per unit of time is greater than 1, countercurrently contacting the said absorbent and the said purge gas in said low pressure zone, removing said purge gas together with said key component from the said first end of said low pressure zone as a secondary gaseous product, removing said absorbent from the said second end of said low pressure zone and introducing the same to the said second end of said high pressure zone, said process being characterized in that substantially the sole transfer of heat to and from said gases occurs within said zones, thereby eliminating the need for external heat transfer.

2. Improved process for the removal of a key component from a gaseous mixture containing the same which comprises introducing said gaseous mixture as feed under pressure into the lower end of a relatively high pressure zone, introducing a liquid absorbent having a relatively slight ability to absorb said key component into the top of said high pressure zone, countercurrently contacting the upflowing gas in the downflowing absorbent, removing said absorbent from the bottom of said high pressure zone containing said key component and introducing the same directly into the top of a low pressure zone, removing a gaseous stream from the top of said high pressure zone as a primary product gas stream, segregating a portion of said product gas stream for purge and introducing the same into the bottom of said low pressure zone wherein the actual volume of purge gas to actual volume of feed ratio per unit of time is greater than 1, countercurrently contacting the downflowing absorbent and the upflowing gas in said low pressure zone, removing said upflowing purge gas together with said key component from the top of said low pressure zone as a secondary gaseous product, removing said absorbent from the lower end of said low pressure zone and introducing the same to the top of said high pressure zone, said process being characterized in that substantially the sole transfer of heat to and from said gases occurs within said zones, thereby eliminating the need for external heat transfer.

3. A process as defined by claim 2 wherein said key component comprises moisture.

4. A process as defined by claim 2 wherein said gaseous mixture comprises hydrogen and said key component comprises moisture.

5. A process as defined by claim 2 wherein said key component comprises an oxide of carbon.

6. An improved process for removing moisture from a desired gas containing the same which comprises introducing the said gas as feed under pressure into the lower end of a high pressure zone, introducing a hydrophobic solvent having relatively slight ability to absorb said moisture into the upper end of said zone, commingling the said gas countercurrently with the said hydrophobic solvent whereby the gas is scrubbed and a dry product gas effluent is produced, withdrawing the said solvent containing the said moisture from the lower end of the said high pressure zone and passing the same to the upper end of a stripping zone maintained under substantially lower pressure than the said high pressure zone, removing a portion of said dry gas effluent from the upper end of said high pressure zone, passing the remaining portion of said dry gas effluent as purge gas through a throttle valve, thereby lowering its pressure, introducing said low pressure dry gas effluent in the lower end of the said low pressure zone wherein the actual volume of the purge gas to actual volume of feed ratio per unit of time is greater than 1, countercurrently commingling said low pressure dry gas and said solvent containing the said moisture whereby the said moisture is removed from the said solvent and absorbed by said low pressure gas; removing said low pressure gas containing the said moisture from the upper end of the said low pressure zone, removing said dry solvent from the lower end of said low pressure zone, and introducing same into the upper end of said high pressure zone.

References Cited by the Examiner

UNITED STATES PATENTS

| | | | |
|---|---|---|---|
| 1,905,068 | 4/33 | Sperr | 55—32 X |
| 2,114,787 | 4/38 | Smith | 55—32 X |
| 2,428,643 | 10/47 | Young | 55—32 |
| 2,614,658 | 10/52 | Maher et al. | 55—48 |
| 2,791,290 | 5/57 | Natta | 55—44 |
| 2,926,753 | 3/60 | Kohl et al. | 55—68 X |

FOREIGN PATENTS 611,224 10/48 Great Britain.

REUBEN FRIEDMAN, *Primary Examiner.*